United States Patent [19]

Kwon

[11] Patent Number: 4,496,197
[45] Date of Patent: Jan. 29, 1985

[54] LINEAR MOTION BEARING TRUCK AND RAIL ASSEMBLY

[75] Inventor: Ki C. Kwon, Charlotte, N.C.

[73] Assignee: The Bendix Corporation, Southfield, Mich.

[21] Appl. No.: 484,019

[22] Filed: Apr. 11, 1983

[51] Int. Cl.³ ............................................. F16C 29/06
[52] U.S. Cl. ...................................................... 308/6 C
[58] Field of Search ............. 308/3 R, 3 A, 6 R, 6 A, 308/6 B, 6 C

[56] References Cited

U.S. PATENT DOCUMENTS 4,396,235  8/1983  Teramachi ......................... 308/6 C
4,427,240  1/1984  Teramachi ......................... 308/6 C

FOREIGN PATENT DOCUMENTS 2812034  9/1979  Fed. Rep. of Germany ...... 308/6 C
39318   3/1981  Japan .................................. 308/6 R Primary Examiner—Stuart S. Levy
Assistant Examiner—David Werner
Attorney, Agent, or Firm—Kenneth A. Seaman; Raymond J. Eifler

[57] ABSTRACT

A linear motion bearing assembly and rail in which the bearing assembly includes two bearing bodies each having a pair of projections defining recirculating bearing races. The bearing assemblies are each secured to a movable member and to each other in an adjustable preload condition and provide one set of recirculating bearings of each assembly for supporting downward forces including the weight and the other to provide lateral and upward forces.

10 Claims, 16 Drawing Figures

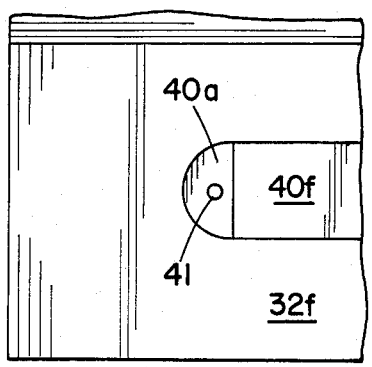
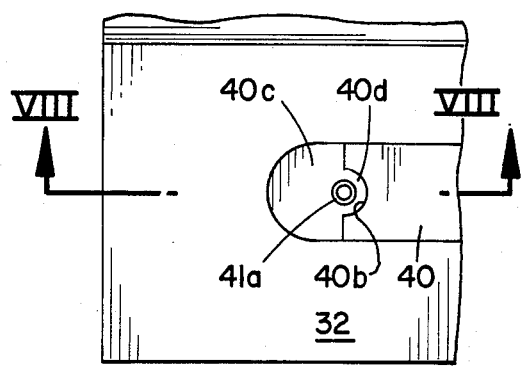
FIG. 7A         FIG. 7B
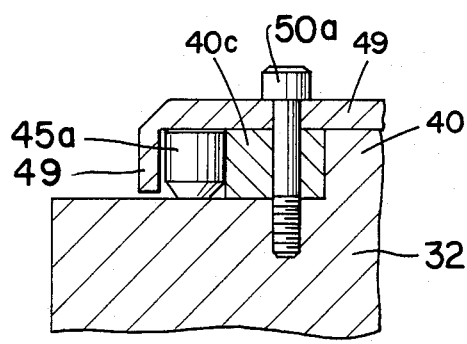
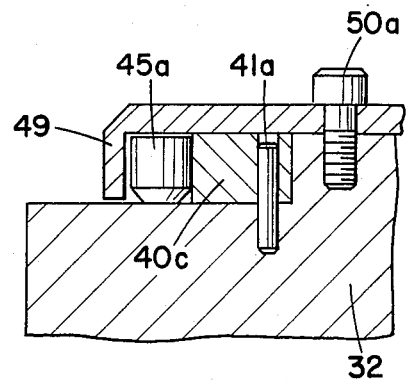
FIG. 8         FIG. 8A

LINEAR MOTION BEARING TRUCK AND RAIL ASSEMBLY

BACKGROUND OF THE INVENTION

1. Technical Field

The present invention relates to improvements in linear motion bearings for slides and ways. The present invention has particular application to machine tools and robots in which precisely-positionable, low friction movement of heavy loads linearly in a single direction (along a rail or way) is required.

2. Background Art

The prior art has proposed several solutions to linear motion truck and way (rail) assemblies. The solutions generally are unacceptable for many machine tool applications, in view of limited load-carrying capacity or useful bearing life or the high cost of manufacturing such bearings. In some situations low friction movement of heavy loads may be necessary or highly desirable without degrading (wearing) the bearing.

For example, U.S. Pat. No. 4,302,059 issued to Teramachi and entitled "Linear Guide Slide Bearing Unit", discloses one such prior art linear bearing assembly in which recirculating rollers are received in V grooves, with alternate rollers being crossed so that a single set of recirculating rollers provides both horizontal and vertical supporting forces. This design requires rails having unusual configurations and a specially manufactured, high precision bearing element mounting body of an unusual shape for receiving and retaining the rollers. Additionally, the load carrying capacity of such bearing unit as disclosed in this patent is substantially limited inherently by its design.

Another prior art concept is shown in U.S. Pat. No. 4,184,719 issued to Ward and entitled "Machine Rails and Carriages". In this system, a portion of a machine tool is mounted by a carriage having multiple sets of cam-follower type bearings for engaging V shaped track members mounted to opposite sides of an unusually shaped track. Such a track is presumed to be difficult and expensive to manufacture accurately and furthermore requires the addition of separate v-shaped members to be positioned and secured thereto. The cam follower bearings proposed in the carriage mounting the machine tool structure have a limited load carrying capacity and has the further disadvantage that it is relatively expensive to manufacture.

Linear way bearings are manufactured and sold under the name IKO linear way (LWA) bearing. The bearing of this embodiment is a ball bearing which the manufacturer suggests is in four point contact including two points of contact with the bearing housing connected to the slide and two points with the rail. Besides being limited in its load carrying capacity by virtue of its relying on steel balls as bearing elements, this assembly requires an unique custom track or rail which adds manufacturing costs. Additionally, it is difficult to set such bearings up to have a predetermined amount of preload and accurate position with respect to the table and the rail to allow for free movement of the rollers within grooves in the rail.

Mounting of a plurality of separate dumbbell-roller bearing assemblies of the type shown in U.S. Pat. Nos. 3,003,878 to Stark or 3,343,262 to Kalmanek has also been suggested. Such a system advantageously can carry a heavy load with low friction. Because of cost, however, of multiple bearing assemblies themselves and of the mounting costs involved with individual mounting and alignment, such a system is not favored in many applications.

Accordingly, prior art linear bearing assemblies have substantial limitations and disadvantages which make them undesirable for machine tool applications.

DISCLOSURE OF THE INVENTION

The present invention is a linear motion truck including recirculating roller bearings and a rail for mounting such a truck thereon which has the dual advantage of a low manufacturing cost and improved performance in terms of positioning accuracy, load and life. The present invention is characterized by a bearing truck or assembly which is composed of two bearing bodies adjustably secured together, with each of the bodies including a first set of recirculating bearings elements which operates generally vertically to provide a high downward vertical load capacity (to support the machine tool load from its weight and other downward forces) and a second recirculating bearing race which provides a lateral component as well as a component preventing upward vertical movement of the bearing and load. The foregoing characterization is based upon a mounting of the bearing for horizontal movement.

The present invention has the advantageous effect that a low manufacturing cost is obtained through the use of a minimum number of parts, a substantial employment of conventional parts and reduction of machining necessary, and a minimum number of load bearing structural elements.

The present invention has the added advantageous effect that it simplifies the design and use of the bearings and provides ease of mounting. The bearing assembly may be used vertically, horizontally or obliquely.

An advantageous effect is achieved through the use of securing means between the two halves of the bearing assembly to provide an adjustable preload to control the amount of initial bearing load between the bearing assembly and the rail. A bolt tensioned to provide a controlled preload extends between the two bearing halves with a controlled separation achieved by a spacer, securing the bearing halves together and engaging the rail with a predeterminable force.

A further advantageous effect of the present invention is that the bearing assembly provides a load carrying capacity (retaining forces) in all directions, with the lateral load carrying capacity being balanced on both sides and the greatest downward load carrying capacity to support the weight and other vertical downward machine loads with an adequate upward load carrying capacity for normal use in machine tool applications.

The present invention also includes a method of manufacturing the bearing in which bearing bodies are formed, each having a pair rectangular prismatic projections to which semi-cylindrical bodies are attached to each end to define bearing races.

Other objects and advantages of the present invention will be apparent to one skilled in the art of bearing manufacturing and use in view of the following description of the best mode for carrying out the invention, the claims which are appended and the accompanying drawings, all of which are provided for a better understanding of the present invention.

BRIEF DESCRIPTION OF THE DRAWINGS

FIG. 7A is a partial enlarged front view of the bearing body of FIG. 6A or 6B with a rounded race end added.

FIG. 7B is a partial front view of an alternate embodiment to that shown in FIG. 7A.

FIG. 8 is a partial cross sectional view of the bearing assembly portion of FIG. 7B, taken along the line VIII—VIII looking in the direction of the arrows.

FIG. 8A is a partial cross sectional view of an alternate embodiment to that shown in FIG. 8.

BEST MODE FOR CARRYING OUT THE INVENTION

Figure 1:
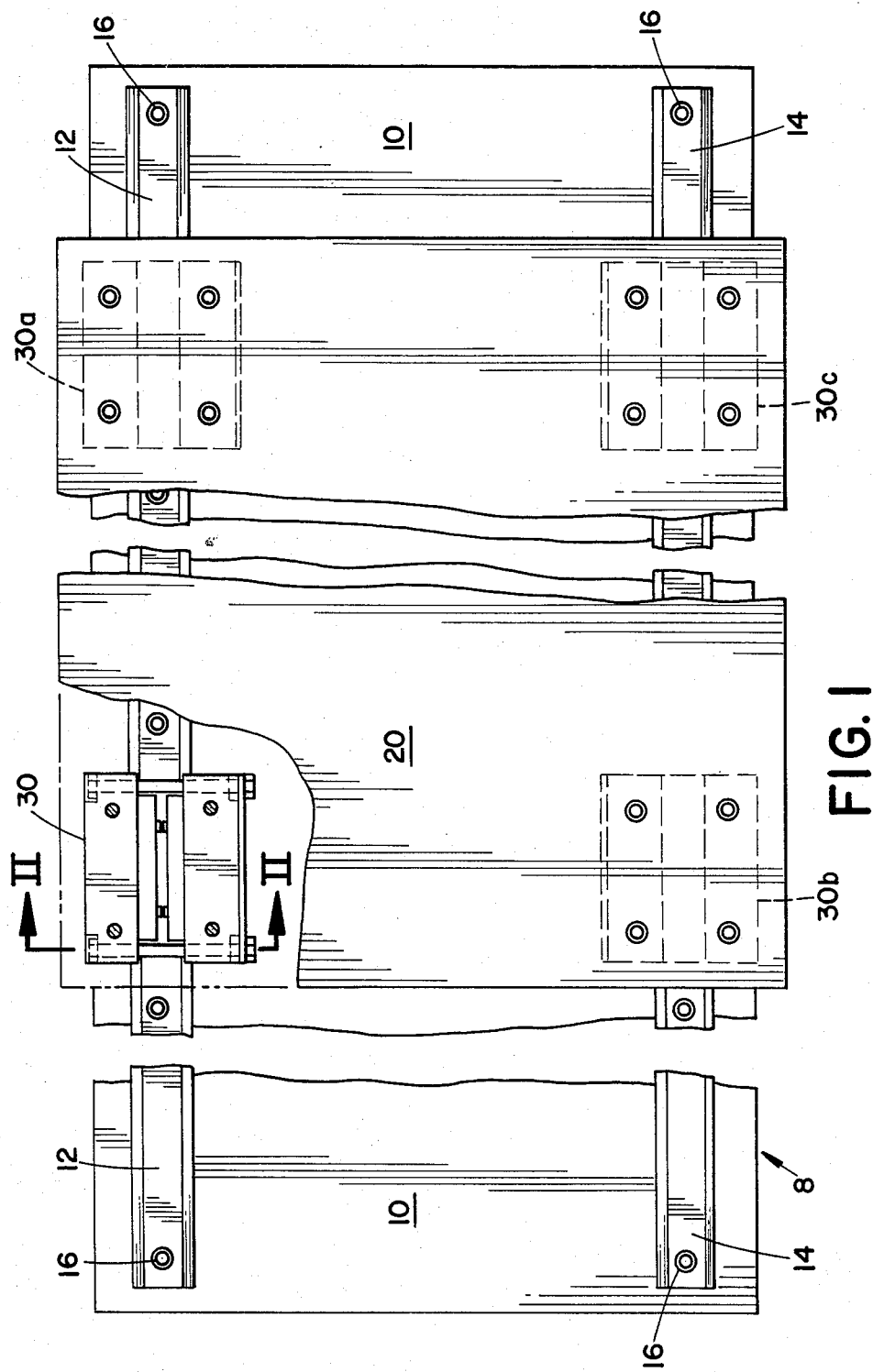
FIG. 1 is a partial top view of a portion of a machine tool, partially cut away to reveal the bearing truck structure of the present invention.

FIG. 1 is a partial top view of a portion of a machine tool 8, partially cut away to show the bearing structure of the present invention in an illustrative embodiment. As shown in this view, the machine tool 8 includes a bed 10 with a first rail 12 and a second rail 14, each secured to the bed 10 by screws 16 fitted into threaded holes in the bed 10. A positioning table 20 is mounted to traverse along the rails 12, 14 by bearing assemblies 30, 30a, 30b, 30c.

The machine bed 10 (sometimes referred to as a frame or base of the machine tool) in its preferred embodiment extends in a horizontal plane. The positioning table 20 (sometimes also referred to as a slide or carriage assembly) mounts a horizontally movable member, either a work piece or a tool assembly of some kind, depending on the construction for movement generally back and forth in the direction of the rails. The first rail 12 is positioned to be parallel with the second rail 14 to allow free movement, yet precise linear movement, of the table 20 with respect to the bed 10. The bearings 30, 30a, 30b, 30c are substantially identical, so only a representative bearing 30 will be discussed in detail.

It should be understood that the arrangement shown is merely illustrative of one representative machine tool and bearing arrangement, and that the present invention is not limited to a machine tool bed located in a horizontal plane, or even to a machine tool at all. The present invention also has application to robots, measuring machines, packaging and plastic machines and other applications in which low friction, high load movement of one member with respect to another is desired. Further, the present invention has application where preload adjustment or captivating the bearing assembly to the rail is desired. Depending upon the types of linear motion and the loading characteristics and the bearing load capacity, the number of required bearing assemblies or their construction could vary. Either greater or fewer bearing assemblies could be employed in a specific application to advantage in the present invention, and in some applications only a single rail might be required.

Figure 2:
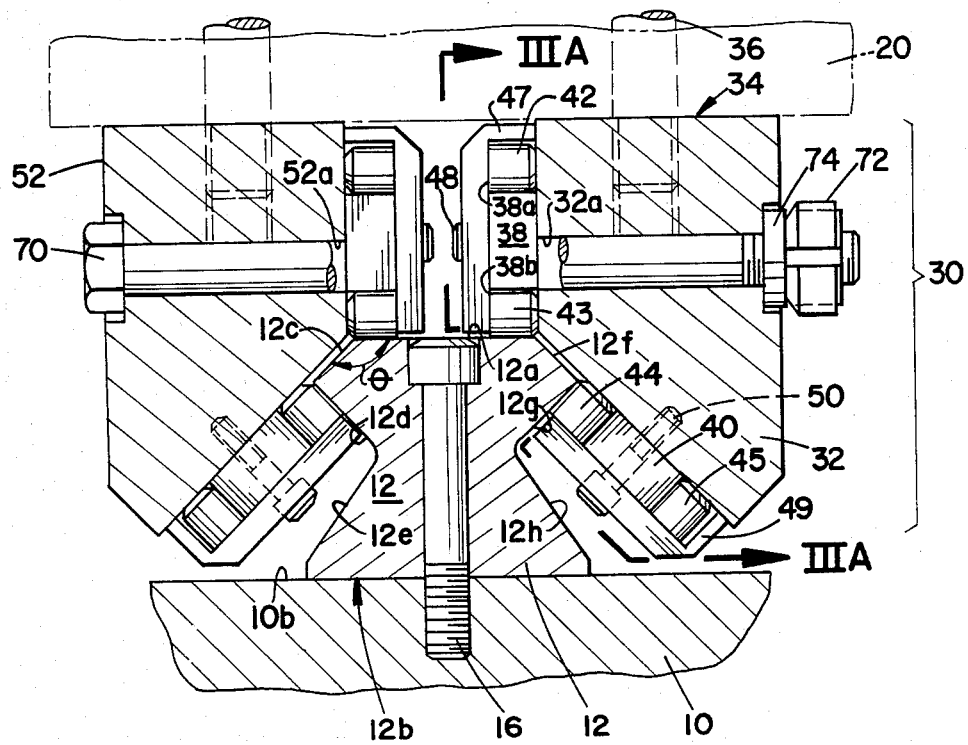
FIG. 2 is a cross sectional view of the machine tool and bearing truck structure of FIG. 1, taken along the line II—II in FIG. 1, looking in the direction of the arrows.

FIG. 2 shows a cutaway cross sectional view of the bearing assembly 30, taken along the line II—II of FIG. 1, looking in the direction of the arrows. As shown in this view, the table 20 is mounted for longitudinal linear motion with respect to the bed 10 by movement of the bearing assembly 30 along the rail 12.

The rail 12 is secured to the bed 10 by the socket head cap screw 16 threaded into a socket in the bed 10. As shown in this view, the rail 12 includes a flat, horizontal upper or end surface 12a. A flat lower surface 12b is in contact with the bed 10 at its upper surface 10b. The rail 12 further includes left side surfaces 12c, 12d, 12e and right side surfaces 12f, 12g, 12h. The first side surface 12c makes an included obtuse angle with respect to the upper surface 12a, causing the first side surface 12c to face upward, but slope downward as it progresses outward. The second side surface 12d is downwardly facing and progresses inward as it progresses downward. In its preferred embodiment the rail 12 is symmetric about its center line which generally passes through the screw 16, so that the left side of the rail and the right side of the rail are mirror images one of the other, with right side surfaces 12f, 12g, 12h corresponding to the left side surfaces 12c, 12d, 12e, respectively. This symmetry, in conjunction with symmetry of the bearing assembly 30 to be described in connection with this and other figures provides two balancing opposite lateral forces which results in a net null force between the table 20 and the bed 10, yet resist lateral forces therebetween.

The bearing assembly 30 includes a first bearing body or base section 32 (also referred to as a bearing half body) and a second bearing body or base section 52, secured together by a bolt or force transmitting member 70 (which passes through apertures 32a, 52a), a nut 72 and a washer 74 toward each end of the bearing assembly 30.

The bearing body 32 has generally a trapezoid-like end cross section, with a flat mounting surface 34 (shown as its top) which is positioned against the table 20, with the body 32 secured thereto by screws 36, only one of which is shown in this view. The bearing body 32 includes first and second bearing race projections or blocks 38, 40, each of which defines internally a path circuitous for a plurality of recirculating bearing elements represented by reference numerals 42, 43 and 44, 45 and disposed in circuitous arrays.

The bearing race projection or bearing block 38 extends parallel to the flat mounting surface 34 and has an upper side surface 38a and a lower side surface 38b shown in this view, which together with connecting rounded ends (not shown) define an inner race (or pathway) for the plurality of recirculating bearing elements represented by reference numerals 42 and 43 in this view. One bearing element 42 is illustrated in this view is located above the projection 38 and in an unloaded engagement with its upper surface 38a (as a return path). The second bearing element 43 is located below the projection 38 in a loaded engagement or load-bearing relationship, captivated between the lower projection surface 38b and the upper surface 12a of the rail 12, supporting a part of the weight of the table 20. A bearing cap or cover 47 is retained by screws 48 (only one of which is shown in this view) fastened to the bearing body 32 to retain the bearing elements 42,43 against lateral movement away from the bearing body 32.

The second projection 40 extends downwardly from the first bearing body and inwardly toward the rail 12 and the other bearing body 52. The projection 40 extends generally parallel to the side surface 12g, with a plurality of bearing elements (represented by bearing element 44) captivated in a load transmitting relationship between the side surface 12g of the rail 12 and the projection 40, the loading surface of the first bearing body 32. Bearing element 45 represents a return path for recirculating bearing elements on the return path in an unloaded condition, with bearing elements 44,45 are capativated against lateral movement away from the body 32 by a bearing cap or cover 49 secured by screws 50 (only one shown) to the first bearing body 32.

Figure 3A:
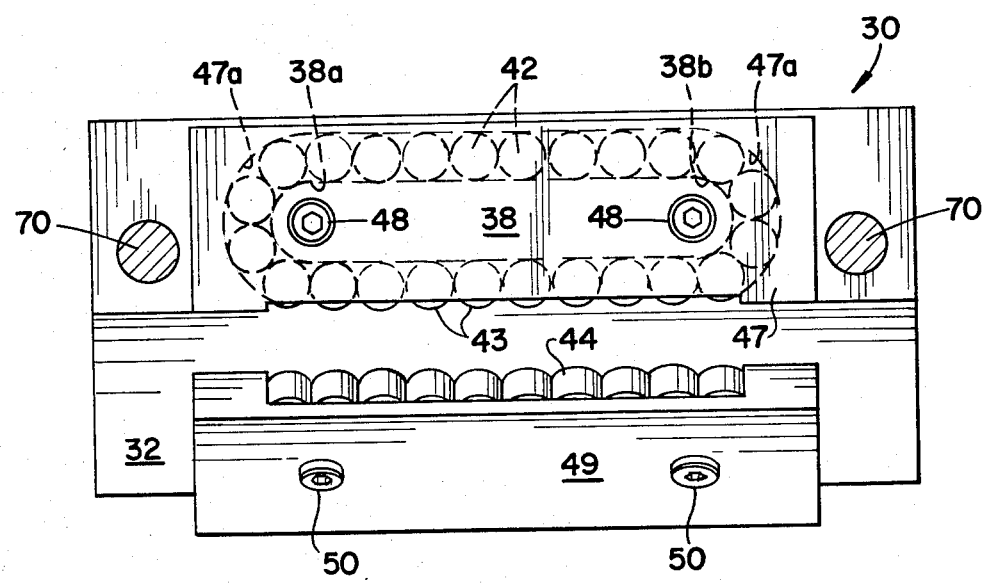
FIG. 3A is a cut away side view of a portion of the bearing assembly of FIG. 2, looking from the line III—III in the direction of the arrows.

FIG. 3A is a partial side view of the bearing assembly 30, taken along the line III—III in FIG. 2 illustrating the bearing half body or bearing body 32, with its two bearing caps 47, 49 retained, respectively, by pairs of screws 48, 50. The first bearing race projection 38, shown by dotted lines, is behind the bearing cap 47. The cap 47 has an internal structure 47a which serves as a bearing element retainer and defines the outer bearing race surface for guiding the roller elements 42. The bearing race projection 38 defines the internal race surface for guiding the roller elements. The race projection 38 includes rounded end portions 38a, 38b. Bearing elements 42 represent the unloaded (returning) roller bearing elements, while bearing elements 43 represent load carrying rollers which support the vertical downward machine load when fully assembled.

Each of the covers 47, 49 is shown held in place by a pair of retaining screws 48, 50, respectively. As shown in this view, the cover 47 is generally rectangular on its outer shape and has a "C" shaped internal channel 47a which defines the outer periphery of the bearing element return path for unloaded bearing elements 42. This cover 47 could either be stamped, formed by an investment or die casting in the desired shape or machined to have the desired shape. The cover 49 has a similar shape but is mounted in a different orientation.

The bolts 70 are shown passing through the bearing body 32 in its upper portion. The bolts 70, combined with associated nuts and washers, allow an adjustable preload to be applied between the halves of the bearing assemblies 30 and the rail 12.

Figure 3B:
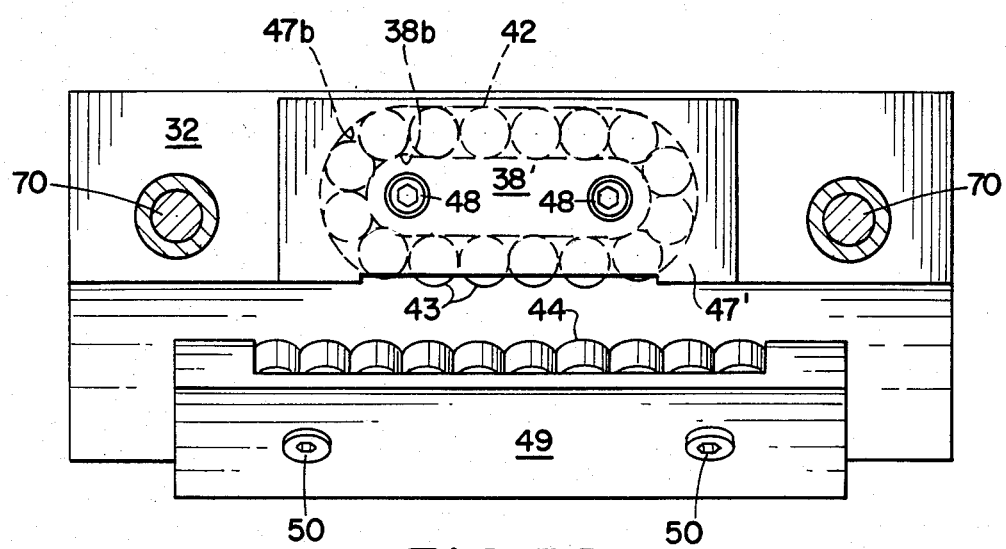
FIG. 3B is an alternate embodiment to that shown in FIG. 3A.

FIG. 3B is an alternative design to that shown in FIG. 3A in which a projection 38' is formed smaller than the projection 38 in FIG. 3A. Fewer bearing elements 42,43 and a smaller cap 47' are employed, with attendant cost savings, and is appropriate where the load carried by this bearing race is reduced as it would be where the linear motion is vertical, as opposed to horizontal as discussed in FIG. 1.

Figure 4:
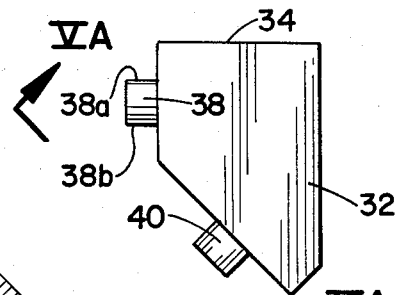
FIG. 4 is an end view of a body portion of one half of the bearing assembly of FIGS. 2 and 3A.

FIG. 4 is a side view of the first bearing body 32, showing better the first race projection 38 and the second race projection 40 which are preferably formed integrally (at least in part, as discussed in connection with FIGS. 5-8A) as a single piece with the body 32. Ignoring the rounded end portions (e.g. shown by reference numerals 38a, 38b in FIG. 3A) associated with the projection 38 (and that the projections 38, 40 extends only partially across the width of the block 32 in FIG. 3A), bearing block 32 has a uniform cross section throughout and could be advantageously formed by an extrusion of a single piece of bearing steel, such as 52100 steel. Alternatively, the bearing block could be made by an investment casting or forging method, either with or without the rounded end portions of the projections. As another alternative, the projection 38, 40 could be separately manufactured either from the same or different material as the bearing block 32 and assembled and secured to the block 32 in a know manner. The bearing block 32 shown here has the upper surface 34 which is secured to the movable member (such as the positioning table or slide 20) and the projection 38 has the upper (non-load-bearing) surface 38a and the lower surface 38b substantially parallel thereto, to allow the bearing elements on race surfaces 38b to provide substantially downward load carrying capacity which will support the downward vertical machine load. The projection 40 extends downwardly and inwardly toward the rail when mounted.

Figure 5A:
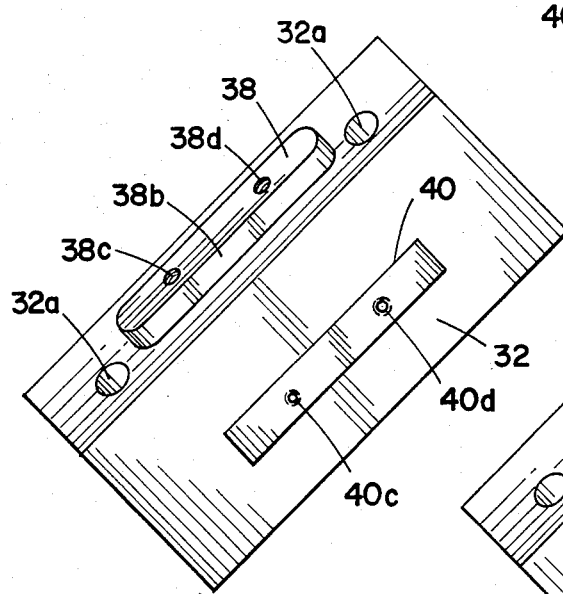
FIG. 5A is a front view of the bearing body of FIG. 4, looking from the line V—V in the direction of the arrows.
Figure 5B:
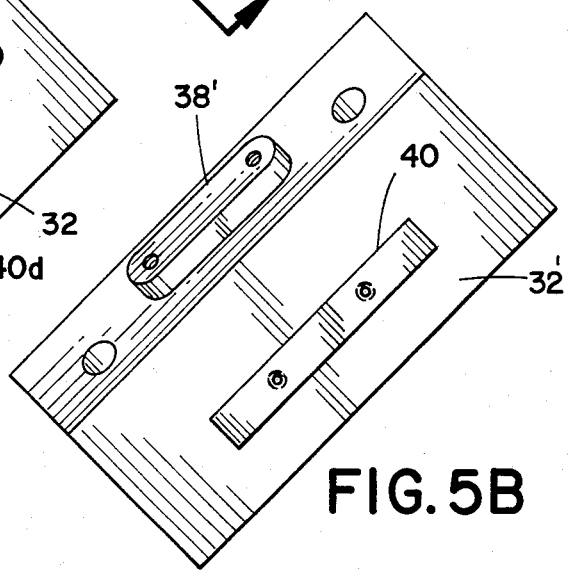
FIG. 5B is an alternate embodiment to that shown in FIG. 3B, corresponding to the structure of FIG. 3B.

FIGS. 5A and 5B show front views of bearing bodies 32,32', respectively, with a one-piece projection as might be made in a casting forging or machining process. In FIG. 5A, the projection 38 is shown with holes 38c,38d for receiving bearing cap retaining screws (not shown in this Figure). The lower surface 38b is shown in this view, as is the projection 40 and screw holes 40c,40d. In FIG. 5B, the projection 40 is as shown in FIG. 5A, but the projection 38' is shortened corresponding to that shown in FIG. 3B and described in connection therewith.

Figure 6A:
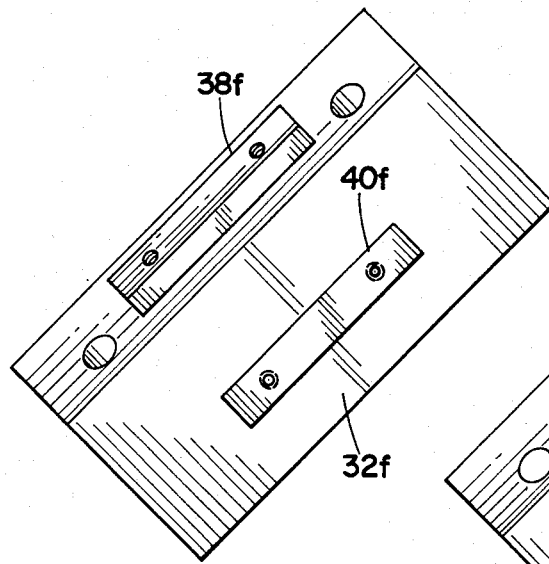
FIGS. 6A and 6B are front views of bearing body similar to FIGS. 5A and 5B respectively, but with projections only partially formed as integral pieces (without rounded race ends).
Figure 6B:
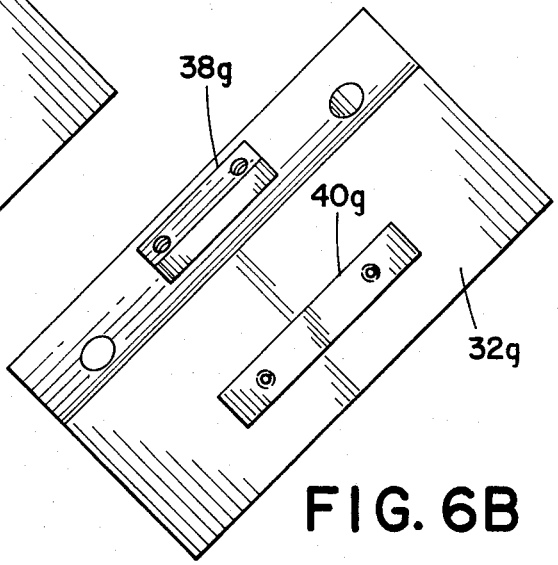

FIGS. 6A and 6B shows front views of bearing blocks 32f and 32g, respectively, with projections 38f, 40f in FIG. 6A and projections 38g,40g, in FIG. 6B. This view which shows ends of the projection squared off in the form of a rectangular prism, might result from the extrusion process, before rounded ends are placed in position or formed at the ends thereof. The shortened projection 38g of FIG. 6B corresponds to that shown in FIGS. 3B and 5B.

FIG. 7A shows the bearing block 32 and the rectangular-prism-shaped projection 40, with a rounded end 40a formed by a half round (semi-cylindrical) piece held in place by a pin 41 which extends through the rounded end 40a into the block 32. The semi-cylindrical piece or rounded end 40a could be formed by bisecting a cylindrical rod along its axis. As an alternate, the rounded end 41 could be formed by machining away portions of the rectangular prism.

FIG. 7B shows an alternate embodiment to that shown in FIG. 7A in which the rectangular-prism-shaped projection 40 has a semi-circle cut out or recess 40b formed in its end and a rounded end piece 40c includes a rounded projection 40d to fit within the semi-circular cutout 40b. A pin 41a secures the end piece 40c to the body 32 as in FIG. 7A. The fitting of rounded projection 40d into the recess 40b serves to lock the end piece 40c into the projection 40 and prevent it from separating from the loaded straight race portion 40 to provide a smooth continuous rounded path and not deflect or pivot as bearing elements pass around it.

FIG. 8 is a side view of the bearing body 32 of FIG. 7B with a bearing element 45a and the cover 49, in place. A screw 50a extends through the cover 49, retains the rounded end piece 40c in place and is secured in the body 32. The end piece 40c is positioned adjacent the rectangular prism projection 40, shown as an integral portion of the body 32, although it could be a separate piece.

FIG. 8A illustrates an alternate embodiment to that shown in FIG. 8 for securing the rounded end piece 40C and bearing cap 40 to the bearing body 32. A roll pin 41a coupled between the end piece 40C and the bearing body 32 secures the end piece 40C in place, and a separate cap screw 50C secures the bearing cap 49 to the bearing body 32 inwardly of the end piece 40C, allowing the end piece 40C and the bearing cap to be independently located.

Figure 9:
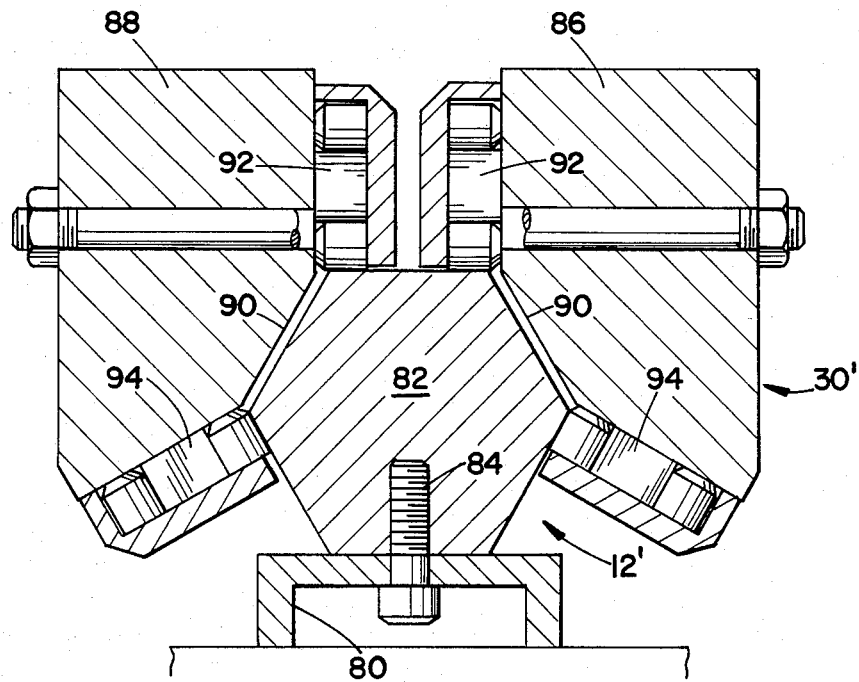
FIG. 9 is a cross sectional view of an alternate machine tool rail system corresponding to the FIG. 2 embodiment, using a somewhat modified bearing.

FIG. 9 illustrates a modified rail 12' and a modified bearing assembly 30' of an alternate embodiment to that shown in FIG. 2. The rail 12' is formed by an elongated, C-shaped (or recumbent U-shaped) beam 80 with a length of hexagonal stock 82 secured by screws 84 thereto. Bearing bodies 86, 88 have an intermediate flat portion 90 between a horizontal projection 92 and an oblique projection 94. The projections 92,94 each define recirculating races for bearing elements as described in connection with FIG. 2, with the projections being parallel to corresponding adjacent portions on the rail 12'.

Figure 10:
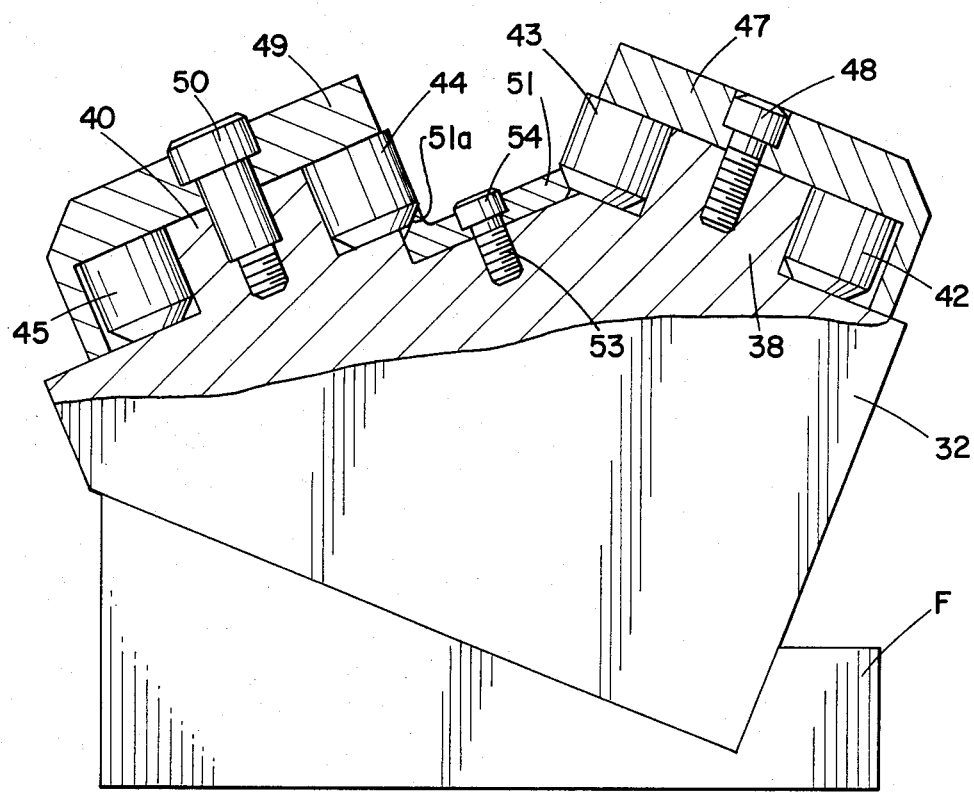
FIG. 10 is a view of the bearing of FIG. 2 during assembly stage.

FIG. 10 is an enlarged view of the bearing body 32 partially inverted and in a fixture F for loading of the recirculating bearing elements 42,43,44,45. The covers 47,49 are mounted to the respective projections 38,40 by the respective screws 48,50. An L-shaped bracket or retainer strip 51 having an angled end 51a (corresponding to the chamfered lower end of the bearing element 44) is secured by a screw 54 fitting in a socket 53 in the bearing body. The single retainer strip 51 serves to retain bearings 44,43 in both recirculating races and may be riveted in place, rather than with a screw as described. The retainer strip 51, a length of low carbon steel (or alternatively brass or copper) retains the bearing elements during shipment and until set up around the rail (12 in FIG. 2). When assembled around the rail and bearing load, the bearing elements are moved away from the retainer strip 51 to avoid rolling contact (and friction) between bearing elements and the strip.

Figure 11:
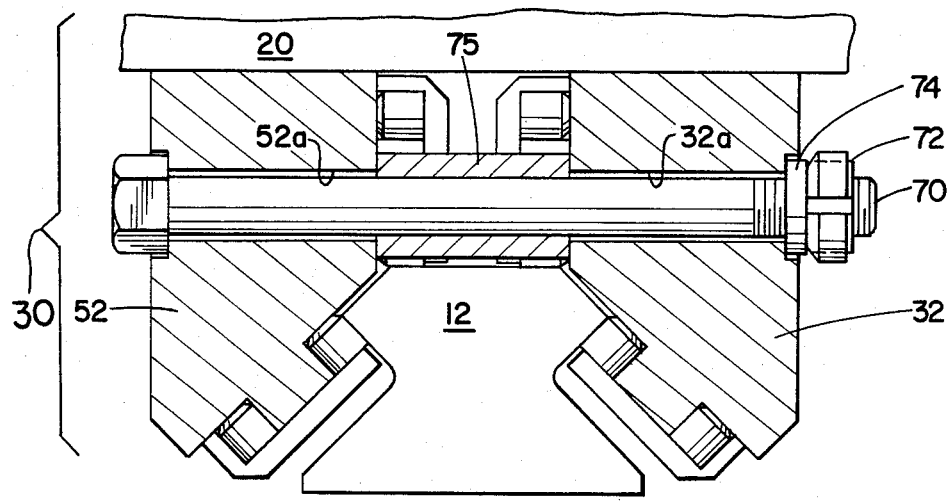
FIG. 11 is a partial cross sectional view of the bearing of FIG. 2 during assembly stage.

FIG. 11 illustrates a preloading arrangement for the bearing assembly 30 including bearing bodies 32,52 mounted to the table 20 (or an assembly plate during assembly set-up). The bolt 70 extends through the apertures 52a,32a in the respective bearing bodies 52,32 and terminates with the nut 72 and the washer 74. During manufacturing assembly set-up, the bearing bodies 32,52 are mounted loosely to the assembly plate, with the bolts 70, washer 74 and nut 72 at each end, and spacer 75 intermediate the bearing bodies 32,52. The spacer 75, which may be either a tubular bushing or a C-shaped member having a cross section similar to an open washer, may be initially a temporary undersize member, so that a feeler gage or skim of appropriate thickness may be inserted after the bearing bodies 32,52 are bolted to the assembly plate and in running fit with the rail 12, then a permanent spacer of the appropriate length (the length of the temporary undersized member plus the feeler gage or shim) is prepared and installed in place of the temporary member and shim.

The spacer 75 provides a controlled separation between the bearing bodies 32,52 which are tightly held together by the bolt 70 and the nut 72, to prevent the lower portion of the bodies from moving outward under the load, preventing tilting of the bodies or outward rotating moments. In some cases, the spacer 75 may include multiple pieces including shims.

Lubrication of the roller bearing element may be provided, if desired, in a conventional manner, as known in the prior art. This may be accomplished for example, by providing outside-mounted oil fittings and-/or top lube holes and fittings coupled to the bearing races by appropriate internal apertures, the location and number of which may depend upon the application.

Many modifications and substitutions are possible to the preferred embodiment (and the alternate embodiments) previously disclosed in this patent application without departing from the spirit of the present invention. For example, the single piece bearing body members disclosed and discussed in detail could be replaced by multi-piece members which could have similar operating characteristics, yet different manufacturing costs, and perhaps allow the two bearing races to be relatively adjustable. Additionally, various manufacturing methods could be employed to advantage to make each bearing body. Further, other methods of securing the parts together will be apparent to one skilled in the manufacturing of such elements. Further, the bearing truck assemblies and returns could be manufactured in different ways, perhaps integral with the bearing housing by machining, casting, or other suitable manufacturing techniques. Additionally, the individual recirculating bearing elements which are disclosed as single chamfered rollers need not be identically as disclosed, but rather could be ball bearing elements, dumbbell-shaped roller elements, double chamfered rollers or other suitable bearing elements, as known in the art. Further, the geometry of the individual bearing bodies described and shown is believed preferred, but not critical, for the present invention. Accordingly, selected features or elements of the present invention may be used individually without the corresponding use of other features or element as disclosed. Thus, it will be seen that the foregoing description of the invention is merely illustrative of the present invention and should not be considered in limitation thereof. The present invention is limited or defined solely by the following claims.

Having thus described the invention, what is claimed is:

1. A bearing assembly for use in supporting a member for movement along a rail having a longitudinally extending end surface, a first longitudinally extending side surface diposed adjacent to a first edge of the end surface and skewed at an acute angle to the end surface and a second longitudinally extending side surface disposed adjacent to a second edge of the end surface and skewed at an acute angle to the end surface, said bearing assembly comprising a first base section adapted to be disposed adjacent to the first side surface and first edge of the end surface of the rail, first connector means for use in connecting said first base section with the member, a first bearing block connected with said first base section and disposed adjacent to the first side surface of the rail, said first bearing block having a side surface extending parallel to the first side surface of the rail, a first circuitous array of bearing elements circumscribing said first bearing block, said first circuitous array of bearing elements including a first linear group of bearing elements having outer side surfaces which roll on the side surface of said first bearing block and the first side surface of the rail to enable force to be transmitted between said first bearing block and the first side surface of the rail, a second bearing block connected with said first base section and disposed adjacent to the end surface of the rail, said second bearing block having opposite side surfaces extending parallel to the end surface of the rail and extending at an acute angle to the side surface of said first bearing block, a second circuitous array of bearing elements circumscribing said second bearing block, said second circuitous array of bearing elements including a first linear group of bearing elements having outer side surfaces which roll on a first one of the side surfaces of said second bearing block and on the end surface of the rail to enable force to be transmitted between said second bearing block and the end surface of the rail, said second circuitous array of bearing elements including a second linear group of bearing elements having side surfaces which roll on a second one of the side surfaces of said second bearing block, a second base section formed separately from said first base section and adapted to be disposed adjacent to the second side surface and second edge of the end surface of the rail, second connector means for use in connecting said second base section with the member, a third bearing block connected with said second base section and disposed adjacent to the second side surface of the rail, said third bearing block having a side surface extending parallel to the second side surface of the rail, a third circuitous array of bearing elements circumscribing said third bearing block, said third circuitous array of bearing elements including a first linear group of bearing elements having outer side surfaces which roll on the side surface of said third bearing block and the second side surface of the rail to enable force to be transmitted between said third bearing block and the second side surface of the rail, a fourth bearing block connected with said second base section and disposed adjacent to the end surface of the rail, said fourth bearing block having opposite side surfaces extending parallel to the end surface of the rail and extending at an acute angle to the side surface of said third bearing block, a fourth circuitous array of bearing elements spaced from said second circuitous array of bearing elements and circumscribing said fourth bearing block, said fourth circuitous array of bearing elements including a first linear group of bearing elements having outer side surfaces which roll on a first one of the side surfaces of said fourth bearing block and on the end surface of the rail to enable force to be transmitted between said fourth bearing block and the end surface of the rail, said fourth circuitous array of bearing elements including a second linear group of bearing elements having side surfaces which roll on a second one of the side surfaces of said fourth bearing block, and force transmitting means interconnecting said first and second base sections and disposed between a plane containing the end surface of the rail and a plane extending parallel to the end surface of the rail and through said second linear groups of bearing elements in said second and fourth circuitous arrays of bearing elements to hold said first and second base sections against separation under the influence of force components transmitted between said first and third bearing blocks and the first and second side surfaces of the rail.

2. A bearing assembly as set forth in claim 1 wherein first and third circuitous arrays of bearing elements are subjected to greater operating forces than said second and fourth arrays of bearing elements and have a greater number of bearing elements disposed in rolling engagement with the side surfaces of the rail than the second and fourth arrays of bearing elements have disposed in rolling engagement with the end surface of the rail.

3. A bearing assembly as set forth in claim 1 further including a first cover member extending across said second circuitous array of bearing elements and a second cover member extending across said fourth circuitous array of bearing elements, said first and second cover members being spaced apart and being disposed between the member and the end surface of the rail.

4. A bearing assembly as set forth in claim 1 wherein said force transmitting means is adjustable to apply preload forces to said first and second base sections urging them toward each other.

5. A bearing assembly as set forth in claim 1 wherein said force transmitting means includes a first force transmitting element disposed adjacent to one end portion of said second and fourth circuitous arrays of bearing elements and a second force transmitting element disposed adjacent to another end portion of the second and fourth circuitous arrays of bearing elements.

6. A bearing assembly of the type described in claim 1 wherein each of said bearing blocks includes rounded end portions, each of said end portions being formed as separate elements and secured to one of said base sections to provide a bearing element return path at each end of one of said bearing blocks.

7. A bearing assembly of the type described in claim 6 wherein said rounded end portions are positioned and carried by one of the bearing blocks in a controlled spatial relationship, said controlled spatial relationship being provided by an enlargement carried upon one of said rounded portions and said bearing block and a complimentary recess carried on the other of said projection and rounded portion, whereby said enlargement fits within the complimentary recess.

8. A bearing assembly of the type described in claim 6 wherein said rounded portions are secured to said base sections by pins extending through holes in the rounded portions into said base sections.

9. A bearing assembly of the type described in claim 8 wherein said bearing assembly further includes retaining covers mounted externally to said circuitous arrays of bearing elements, said covers being mounted on said base sections by extensions of the pins which retain the rounded end portions of the bearing blocks.

10. A bearing assembly of the type described in claim 1 wherein said first and second base sections are generally symmetrical about a center line passing through the rail.

* * * * *